United States Patent Office 3,430,815
Patented Mar. 4, 1969

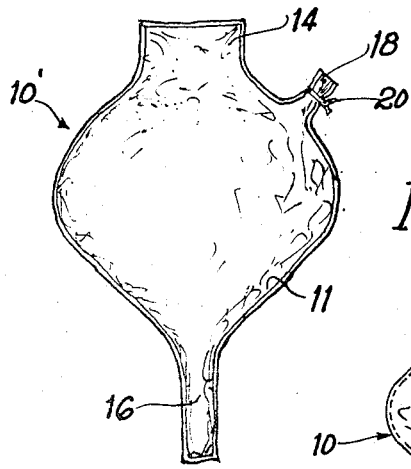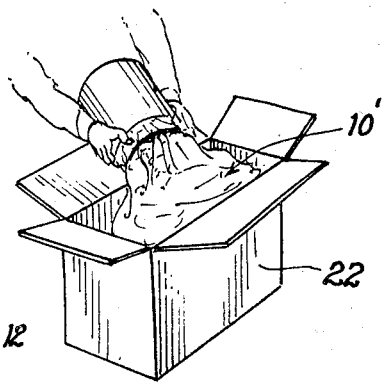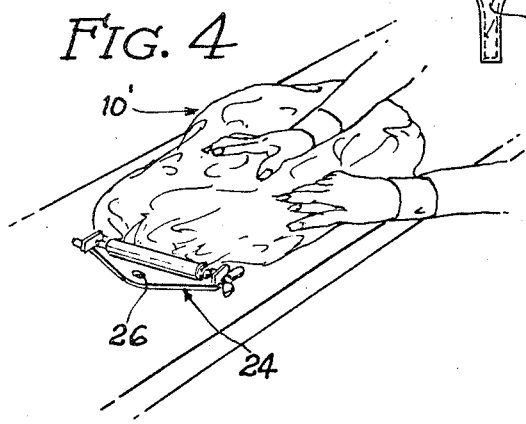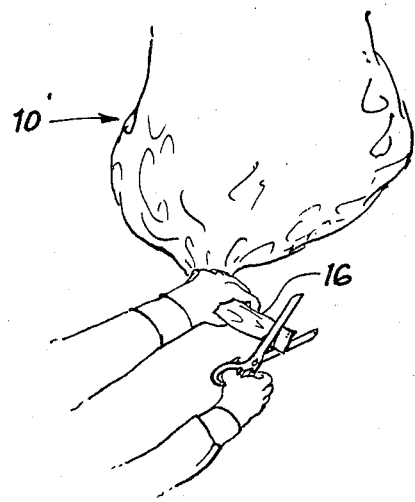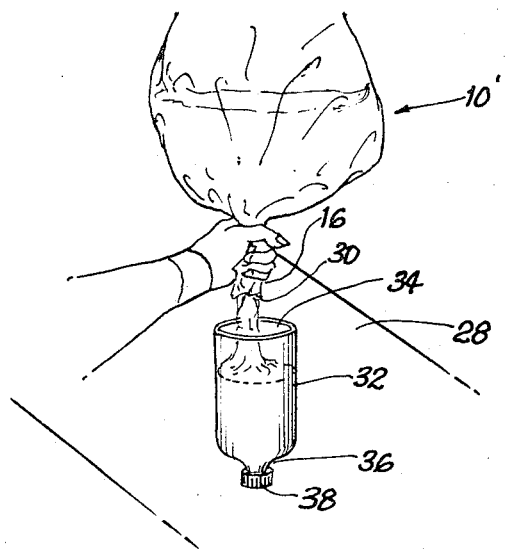

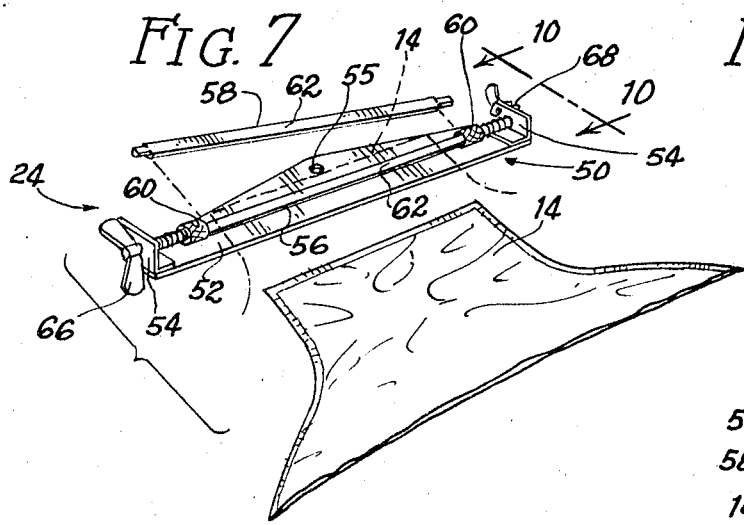
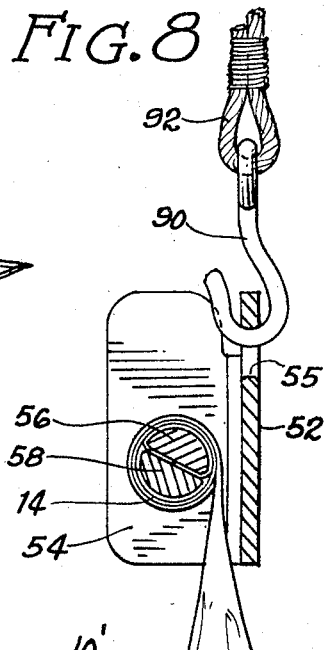
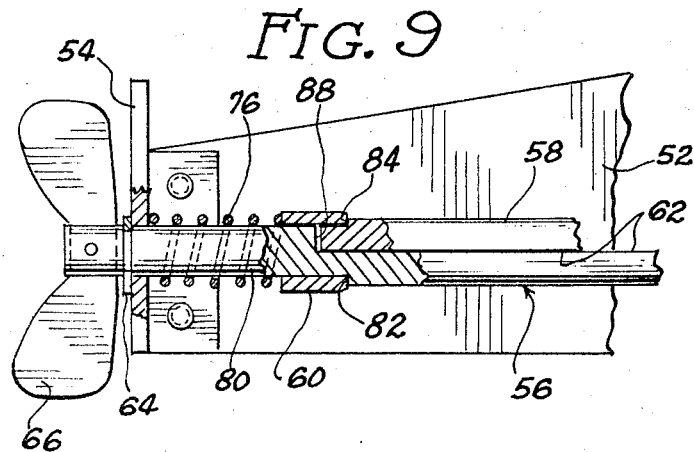
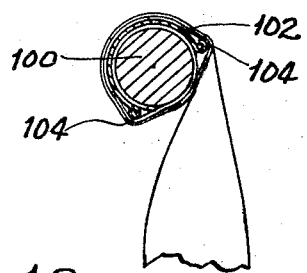
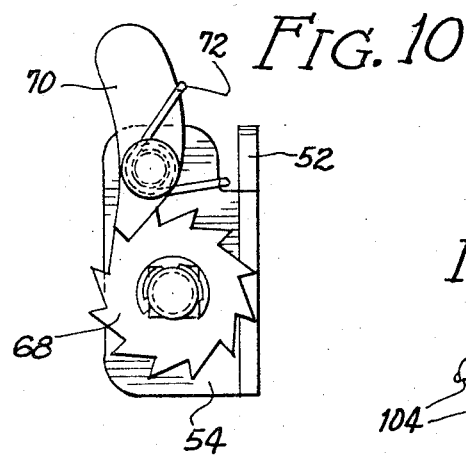
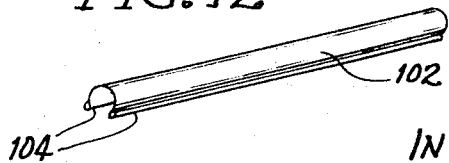

3,430,815
SANITARY METHOD AND MEANS FOR HANDLING, PREPARING AND DISPENSING FLUENT FOOD PRODUCTS IN AND FROM A SUSPENDIBLE BLADDER
Ralph E. Weimer, Lombard, and Ronald M. Herbert, Hanover Park, Ill., assignors to McDonald's System, Inc., a corporation of Illinois
Filed Feb. 13, 1967, Ser. No. 615,660
U.S. Cl. 222—99   3 Claims
Int. Cl. B65d 35/10, 35/56, 33/16

ABSTRACT OF THE DISCLOSURE

This application discloses a suspendible hanger of the reel type for suspending a bag or bladder in which several ingredients may be mixed. Also disclosed is a multi-opening bladder which serves as a shipping, mixing and dispensing container and a system for utilizing said bladder to intermix products therein and to dispense products therefrom.

Background of the invention

Intermixed products, such as food products like tartar sauce, are frequently prepared at the intended place of use in a large bowl. Such intermixed products are often then removed for use by spooning them out of the bowl. Such a system is presently widely used for making tartar sauce. In that system several large containers of tartar sauce base are introduced into an open bowl. Then the additional ingredients, such as onions and pickles, are introduced and the ingredients are mixed with a large spoon or paddle. That system permits the introduction of impurities, is laborious and time consuming. After the ingredients have been thoroughly mixed, they are spooned into small utilitarian containers from which the intermixed ingredients are dispensed in doses of suitable volume.

Products, such as tartar sauce, are used in large quantities, particularly at drive-in restaurants where large numbers of fish patty sandwiches are sold. To prepare tartar sauce in the manner described is time consuming and laborious and of times must be repeated several times daily at the site of its use. High quality tartar sauce must be made fresh because its shelf life with the pickles and onions therein is very short.

As stated, once mixed the tartar sauce must be removed from the bowl, as by spooning or pouring. That is relatively unsanitary and ofttimes causes spillage, requiring clean-up. When it is removed from the bowl the tartar sauce is placed in further containers of smaller size for ultimate use. One such container presently in use is a bottle, the bottom of which is open and adapted to receive a piston. It is similar to a caulking cartridge, but may be of a reusable sanitary material such as polyethylene. When the bottle has been filled, as by spooning, the piston is placed in the open bottom and the cartridge is placed in storage until it is to be used with a gun like a caulking gun, thereby to dispense, incrementally, doses of predetermined volume from the bottle.

It is particularly against that background that the improved system of this invention has been developed.

In accordance with this invention a new and highly sanitary method of preparing and handling products, such as tartar sauce, is provided. It eliminates the necessity of bowl mixing and spooning and speeds the preparation of products such as tartar sauce. It introduces a disposable container adapted to serve as a shipping container, as a mixing container and as a dispensing container in various stages of its use. The container is substantially sealed at all times, hence highly sanitary. The disposable container is cooperable with a hanger for sealingly suspending the container during dispensing.

Summary of the invention

This invention contemplates a new system for preparing and dispensing intermixed products such as tartar sauce. It utilizes a hermetically sealed bladder containing a first intermixable ingredient which is openable at an entry end to receive one or more additional ingredients and which is then closable to permit thorough mixing of the ingredients in the bladder. The bladder containing the intermixed ingredients is then freely suspendible to permit the contents to be discharged or dispensed incrementally through a lower openable discharge neck.

The suspending or hanger means serves to grippingly seal the entry end of the bladder, and in a presently preferred embodiment comprises a frame supported reel assembly through which the entry end of the bladder extends and upon which the entry end of the bladder is wound.

In preparing a product such as tartar sauce in accordance with one aspect of the method of the present invention, a hermetically sealed bladder containing tartar sauce base is shipped to the site where it is to be used, the mouth portion of the bladder is opened, at least one ingredient is introduced through said open mouth, the mouth is closed, the ingredients are intermixed within the bladder, the bladder is suspended, a lower discharge neck is opened and the intermixed product is dispensed, incrementally if desired, through the opening into a further suitable container. Thus the bladder, which may be disposable, serves as a shipping, mixing and dispensing container, providing a simple sanitary rapid system for making and dispensing a product such as tartar sauce and eliminates the necessity of special mixing equipment and the clean-up necessitated by conventional at-site mixing and dispensing processes and systems.

These and other advantages and objects of the sanitary mixing and dispensing system provided by the apparatus and methods of this invention will become apparent from the following description and drawings.

Brief description of the drawings

FIGURE 1 is a plan view of an unfilled bladder;
FIGURE 2 is a plan view of a sealed bladder of FIG. 1 containing a food product ingredient;
FIGURE 3 is a view of the opened bladder of FIG. 2 in a shipping container showing the mouth open to receive a further ingredient;
FIGURE 4 illustrates the mouth of the bladder sealed closed while the bladder contained ingredients are being intermixed;
FIGURE 5 illustrates the suspended bladder of FIG. 4 and a suitable means for opening the dispensing neck to provide an exit spout;

FIGURE 6 illustrates a manner of incrementally dispensing the contents of the suspended bladder of FIG. 5 into a container;

FIGURE 7 is a partially exploded perspective view of a hanger for sealingly suspending a bladder;

FIGURE 8 is a sectional view of an assembled suspended hanger and bladder;

FIGURE 9 is an enlarged view, partially in section, of the assembled hanger of FIG. 7;

FIGURE 10 is a side elevational view taken substantially along line 10—10 of FIG. 7;

FIGURE 11 is a sectional view of a modified reel assembly; and

FIGURE 12 is a perspective view of a portion of the modified reel assembly of FIG. 11.

*Description of the presently preferred embodiments*

FIGURE 1 illustrates a bag or bladder 10 of a sanitary material. Such a bladder may be formed from two complementary sheets of polyethylene which have been heat sealed around their peripheries to form an envelope. In FIG. 1 the heat seal is shown in dotted line 11. A preferred bladder 10 in which the weight of the contents is most evenly distributed during dispensing defines a generally square main body portion 12, an enlarged mouth portion 14 at an upper corner and a narrow dispensing neck 16 at a lower corner. A filling spout 18 protrudes from one of the sides, preferably one of the body portion sides adjacent the mouth portion so that material will flow downwardly out of it during dispensing.

A heat-sealed bladder 10 has been made of two five mil sheets of polyethylene heat-sealed together at their peripheries. The bladder was approximately twenty-six inches square and defined a mouth about ten inches wide and four inches long (the vertical dimension as seen in FIG. 1). The spout 18 was about two and one-half inches in width and about six inches in length and the dispensing neck 16 about three inches wide and about nine inches in length.

To fill bladder 10 with a first ingredient, such as a tartar sauce base, the first ingredient is discharged through filling spout 18 into the interior of bladder 10, as by a filling machine (not shown). Thereafter, filling spout 18 is closed and hermetically sealed, as with a suitable tie wire 20.

Bladder 10', now filled with a first ingredient and resealed, is placed in a suitable protective shipping container, such as carton 22, for shipment to the user. When the user wishes to utilize the contents of the bladder, the mouth portion 14 is opened as by removing the heat-sealed seam of mouth portion 14 with scissors. The necessary additional ingredients are then added, as for example from a can by inserting the opened can mouth into the opened bladder entry mouth (see FIG. 3). The shipping carton may be used as a form for the flexible bladder 10' until after the ingredients to be added have been added.

The entry mouth of mouth portion 14 is then sealed closed, as by a hanger 24. A suitable hanger 24 will be described in greater detail hereinafter and the mode of its cooperation with the mouth portion 14 will be described in conjunction therewith.

The bladder thus sealed closed is then placed on a convenient work surface and worked and kneaded until the additional ingredients (in the case of tartar sauce, the added onions and pickles) are thoroughly intermixed with the first contained ingredient (see FIGURE 4). Once intermixing is completed the sealed bladder is freely suspended (as via eyelet 26 in hanger 24) at a convenient location, such as over an elevated working surface 28, with dispensing neck 16 lowermost. Neck 16 is then gripped (see FIG. 5) as by the user's hand, and is opened to provide an exit spout 30. The contents of the bladder 10' is then dispensed, such as incrementally into desired containers.

A typical container from which tartar sauce is adapted to be redispensed in predetermined quantities is illustrated in FIG. 6 as a bottle 32. Bottle 32 defines an open bottom 34 which is adapted to be closed by a plunger member (not shown) which is movable incrementally forward by a device such as a caulking gun. The mouth end 36 of bottle 32 is closed by a removable cap 38 which, when removed, uncovers a suitably configured dispensing mouth. Bottles of that type are presently in use, and themselves form no part of the present invention.

The contents of the bladder 10' will fill a plurality of containers such as bottle 32. After a first bottle 32 has been filled to a desired level, the user effectively closes neck 16 as by squeezing it with his hand, another bottle 32 is placed beneath the exit opening or spout 30, the neck is opened again by releasing squeezing pressure, and the further bottle 32 is filled. The operation is repeated until the contents of the bladder are exhausted.

The weight of the bladder contents tends to force the contents downwardly toward and through dispensing neck 16. Because bladder 10' is of a flexible, collapsible material such as sheet polyethylene, the bladder may be gripped by the user's hand above the main body of the contents and additional force to speed discharge may be exerted by squeezing the upper portion and bringing the user's hand downwardly against the main body of the contents. That may also be done to strip the interior of the bladder of the portion of the contents which may adhere to its sides as the the main body of the contents is dispensed by gravity through exit spout 30.

As will be apparent from the foregoing, this invention provides a sanitary method for handling, processing and dispensing a food product. The method utilizes a collapsible bladder as a shipping container, a mixing container and a controllable dispensing container. At least one of the intermixed ingredients is initially hermetically sealed in the collapsible bladder prior to shipment, the remaining ingredients are added at the place of use, the bladder is reclosed and the intermixing proceeds out of contact with the atmosphere. Thus, the possibility of impurities being entrapped during mixing is eliminated. That is always a danger during mixing and handling when an open bowl or the like is used for mixing.

FIGURES 7 to 12 illustrate hangers of this invention which are cooperable with the mouth portions of bladder 10' to sealingly close the entry mouth after the additional ingredients have been introduced.

In FIGURE 7, hanger 24 is illustrated in partially exploded view. It includes a frame 50 comprising a frame plate 52 and L-shaped brackets 54 secured thereto as by riveting. Frame plate 52 defines a hanger eye 55.

Brackets 54 rotatably journal or support a reel assembly which comprises a pair of reel elements 56 and 58. They are releasably securable to each other by spring loaded collars 60. Reel elements 56 and 58 define confronting planar faces 62 for a purpose to be described.

Reel element 56 is permanently journalled on frame 50 and is held against axial displacement by lock washers 64 seated in complementary grooves defined by the reel element. At one end reel element 56 is provided with a turn key 66 pinned thereto and at the other end it is provided with a releasable ratchet assembly which serves to prevent rotation of the reel assembly in one direction of rotation.

The ratchet assembly includes a ratchet 68 corotatably secured to reel element 56. A ratchet release lever 70 is pivotally journalled on a bracket 54. Release lever spring 72 urges release lever 70 into the position illustrated in FIG. 10 to prevent rotation of ratchet 68, hence interconnected reel element 56, in a clockwise direction, while permitting rotation in the counterclockwise direction. To permit rotation in the clockwise direction, release lever 70 is rotated against the force of spring 72 to disengage lever 70 and ratchet 68.

As stated, reel element 58 is removable (see FIG. 7). When in use, it is retained in coupled engagement with reel element 56 by the spring loaded collars 60. Collars 60 are biased into the position shown most clearly in FIG. 9 by compression springs 76. Collars 60 are axially retractable along a reduced diameter portion 80 of reel element 56 to facilitate removal of reel element 58. Inward movement of collars 60 is limited by a shoulder 82 on reel element 56 and desirably also by a shoulder 84 of reel element 58. The ends of reel element 58, when it is engaged with reel element 56, lie closely adjacent the inner edges 88 of reduced diameter portion 80. Thus, when collars 60 are in the position illustrated in FIGURE 9, reel element 58 is locked into engagement with reel element 56 and the confronting planar faces 62 lie in close adjacency to each other.

To use hanger 24, reel element 58 is disengaged and removed, as shown for example in FIG. 7. Once the additional ingredients have been added to bladder 10' through the entry mouth, the entry mouth portion 14 is positioned on planar surface 62 of reel element 56 as seen in phantom in FIG. 7, and reel element 58 is positioned as seen in FIG. 9. At that point the entry mouth portion is confronted by planar surfaces 62 of the reel elements.

Turn key 66 is then rotated in the direction permitted by the ratchet assembly until at least one full turn of the entry mouth portion around the reel is provided. Preferably several full turns are taken by rotating the key.

The bag and assembled hanger may then be positioned as seen in FIG. 4 for intermixing, or hanger 24 may be engaged with a depending hook 90 carried by a suspension means, such as rope 92, and may be elevated partially. In that manner, and particularly when the bag is suspended as shown in FIG. 5, the turns of the entry mouth portion material upon itself, with the weight of the bag contents, will cause the bladder mouth portion to be tightly sealed closed and to prevent slipping out of the reel assembly. Several turns of polyethylene on itself, as seen for example in FIGURE 8, will serve to support bladder 10' and its weight without slipping. This is particularly true where the mouth portion of the bladder is relatively wide to the end that the bladder's weight is well distributed across the hanger.

A further embodiment of a hanger for grippingly engaging the upper end of the bladder with the entry mouth portion sealed closed is shown in FIGS. 11 and 12. As there shown, the reel comprises a solid rod 100 which is mounted with lock washers 64, and which is provided with a key 66 and a ratchet assembly as shown in FIG. 10. A complementary spring reel element 102 having substantially the same interior shape and contour as the exterior of rod 100 is adapted to be snapped to rod 100. It may be made of spring steel. To that end, reel plate element 102 is semicircular in cross section (see FIG. 11) and defines an arc of more than 180 degrees, for example about 210 degrees. The longitudinal edges 104 of reel element 102 are reverse curved and therefore may be gripped to remove reel element 102 from rod 100. Thus edges 104 must be spread apart to remove element 102 from rod 100.

Element 102 has a length comparable to that of reel element 58 to the end that it may overlie substantially the entire width of the mouth portion of a bladder 10' such as in the manner illustrated in FIG. 7. To use the hanger of FIGS. 11 and 12, the entry mouth portion of a bladder is laid across rod 100, element 102 is snapped thereover, and key 66 is rotated until one or more turns of the mouth portion are rolled upon the reel (see FIG. 11). Thereafter the hanger is used in the same manner as described in connection with the embodiment of FIG. 7.

The method illustrated and described in conjunction with FIGURES 1 to 6 has been carried out with a hanger of FIG. 7 and has been found to operate efficiently and advantageously and in the manner herein described. Thus a bladder 10 of the size and shape previously described has been filled through its filling spout with about 21 pounds of tartar sauce base (the equivalent of about three number 10 tins), has been resealed, placed in a carton and shipped. The bladder mouth portion has been opened and onions and pickles introduced so that the final weight of the ingredients has been about 28½ pounds. The mouth portion has been resealed with the hanger of FIGURE 7 and in the manner described and the bladder placed on a table for thorough mixing, as by working and kneading, which latter has been accomplished in about five minutes. The bladder has then been suspended, as illustrated, and has been used to fill containers, like bottles 32. The last portion of the contents which adheres to the interior of the bag has been stripped in the manner described herein.

While we have described presently preferred embodiments of our invention, modifications within the scope and purview of the invention will become apparent to those skilled in the art from the foregoing description and drawings. Accordingly, the scope of this invention is to be determined, not from the specific devices described, but rather in the light of the claims.

We claim:

1. Food dispenser apparatus for incremental dispensing of selected doses of a fluent food product comprising an initially sealed collapsible bladder comprising heat sealed sheets containing a first fluent food ingredient, said bladder comprising a wide entry mouth portion, a substantially wider main body section and a narrow elongate hand grippable spout portion remote from said wide entry mouth portion, said bladder having a severed upper edge defining said wide entry mouth portion for receiving a second food ingredient, said food ingredients being mixed in said main body portion of said bladder, a suspended reel assembly for wrapping said entry mouth portion upon itself to sealingly close said entry mouth portion and to reseal the main body portion of said bladder, for elevating and for suspending said bladder by said wrapped entry mouth portion, said reel assembly comprising a pair of confronting side by side extending reel elements between which said entry mouth portion extends, one of said reel elements being movable toward and away from the other of said reel elements, said bladder terminating at its end opposite said entry mouth portion in said elongate hand grippable exit spout for discharge of said fluent food product therethrough, said spout being of a length sufficient to permit squeezing thereof by a human hand to control dispensing of the fluent food product through said exit spout.

2. The food dispenser apparatus of claim 1 in which said suspended reel assembly supports said reel elements in journalled relation and includes a releasable ratchet normally allowing rotation of said reel elements in only one directon, and means for rotating said reel elements.

3. In a sanitary method of handling, processing and dispensing from an initially sealed, partially-filled shipping bladder containing a viscous liquid mass of food product, said bladder having a large mouth portion adapted to receive a further food ingredient, having an oppositely positioned sealed elongate neck sized to be hand gripped and squeezed and having an intermediate section substantially larger than said mouth portion and said neck, severing said bladder to open the mouth portion, inserting a further food ingredient into said bladder through said opened mouth portion, sealingly closing said opened mouth portion by wrapping same around a reel, then kneading and intermixing said further food ingredient with said viscous liquid mass of food product, suspending said bladder by said sealingly closed mouth portion as wrapped upon said reel, opening said sealed neck thereby to withdraw said intermixed food product through said neck, and hand squeezing said neck to dispense selected quantities of intermixed food product through said opened neck.

References Cited
UNITED STATES PATENTS

| | | | |
|---|---|---|---|
| 2,553,513 | 5/1951 | Denison et al. | 99—179 |
| 3,030,081 | 4/1962 | Wilson et al. | 259—72 |
| 3,157,312 | 11/1964 | Kitterman | 222—107 X |
| 1,417,271 | 5/1922 | Maer | 222—100 X |
| 2,854,717 | 10/1958 | O'Farrell et al. | 229—65 X |
| 2,864,492 | 12/1958 | Lappala | 206—47 |
| 3,177,871 | 4/1965 | Meyers | 206—67.2 X |
| 3,184,121 | 5/1965 | Volckening | 222—541 X |
| 3,214,064 | 10/1965 | Raiha | 222—100 |
| 3,307,549 | 3/1967 | Zackheim | 206—69 X |
| 3,339,716 | 9/1967 | Taylor | 206—47 |
| 3,342,324 | 9/1967 | Piazze | 206—47 |

ROBERT B. REEVES, *Primary Examiner.*

NORMAN L. STACK, JR., *Assistant Examiner.*

U.S. Cl. X.R.

222—105, 181; 206—47; 229—65